(12) United States Patent
Axtell, III et al.

(10) Patent No.: US 6,238,847 B1
(45) Date of Patent: *May 29, 2001

(54) LASER MARKING METHOD AND APPARATUS

(75) Inventors: Enos Ayres Axtell, III, Bridgeville; David C. Kapp, Gibsonia; Timothy A. Knell, McMurray, all of PA (US); Miroslav Novotny, Denville, NJ (US); George Emil Sakoske, Mayfield Heights, OH (US)

(73) Assignee: DMC Degussa Metals Catalysts Cerdec AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,411

(22) Filed: Oct. 16, 1997

(51) Int. Cl.$^7$ .................................................. G03F 7/00
(52) U.S. Cl. .................. 430/322; 430/292; 430/346; 430/945; 427/555; 427/559
(58) Field of Search .................................. 430/322, 945, 430/292, 346; 427/555, 559

(56) References Cited

U.S. PATENT DOCUMENTS

| | | | |
|---|---|---|---|
| 4,327,283 | 4/1982 | Heyman et al. | 235/487 |
| 4,515,867 | 5/1985 | Bleacher et al. | 428/204 |
| 4,541,340 | 9/1985 | Peart et al. | 101/470 |
| 4,651,313 | * 3/1987 | Guez | 369/14 |
| 4,769,310 | 9/1988 | Gugger et al. | 430/346 |
| 4,847,181 | * 7/1989 | Shimokawa | 430/297 |
| 4,854,957 | 8/1989 | Borrelli et al. | 65/30.1 |
| 4,861,620 | 8/1989 | Azuma et al. | 427/53.1 |
| 4,912,298 | 3/1990 | Daniels et al. | 219/121.69 |
| 5,030,551 | 7/1991 | Herren et al. | 430/495 |
| 5,061,341 | 10/1991 | Kildal et al. | 156/632 |
| 5,063,137 | 11/1991 | Kiyonari et al. | 430/292 |
| 5,075,195 | 12/1991 | Bäbler et al. | 430/200 |
| 5,397,686 | 3/1995 | Dominick et al. | 430/346 |
| 5,409,742 | 4/1995 | Arfsten et al. | 427/555 |
| 5,523,125 | 6/1996 | Kennedy et al. | 427/555 |
| 5,543,269 | 8/1996 | Chatterjee et al. | 430/346 |
| 5,554,335 | * 9/1996 | Fields et al. | 264/400 |
| 5,609,778 | 3/1997 | Pulaski et al. | 219/121.69 |

(List continued on next page.)

FOREIGN PATENT DOCUMENTS

| | | |
|---|---|---|
| 3738330 | 5/1988 | (DE) . |
| 4212429 | 10/1993 | (DE) . |

(List continued on next page.)

OTHER PUBLICATIONS

Hahn et al., "Firing PbO–Free Glass Enamels Using the cw–CO$_2$ Laser", *Glastech. Ber. Glass Sci. Technol.*, 1996, pp. 1–6, vol. 69, No. 1.

(List continued on next page.)

Primary Examiner—Kathleen Duda
(74) Attorney, Agent, or Firm—Alan G. Towner; Eckert, Seamans Cherin & Mellott, LLC

(57) ABSTRACT

A method of laser marking substrates such as glass, ceramic, metal and plastic is disclosed. A marking material is applied to the surface of the substrate, followed by irradiation of a portion of the marking material to form a permanent marking on the substrate. The non-irradiated portion of the marking material is then removed from the substrate. The marking material may comprise glass frit or precursors thereof, inorganic pigments or precursors thereof, silicates, metal oxides, sulfides, nitrides and carbides, organometallic materials or metal powders. The marking method is highly versatile, can be performed quickly, and produces permanent marks of high resolution and contrast without damage to the substrate.

50 Claims, 3 Drawing Sheets

U.S. PATENT DOCUMENTS

| | | | |
|---|---|---|---|
| 5,637,244 | 6/1997 | Erokhin | 219/21.69 |
| 5,740,941 * | 4/1998 | Lemelson | 220/454 |
| 5,760,367 * | 6/1998 | Rosenwasser et al. | 219/121.69 |
| 5,761,111 * | 6/1998 | Glezer | 365/106 |
| 5,767,483 * | 6/1998 | Cameron et al. | 219/121.85 |
| 5,783,507 * | 7/1998 | Sakoske | 501/17 |
| 5,804,342 * | 9/1998 | Paz-Pujalt et al. | 430/19 |
| 5,866,644 * | 2/1999 | Mercx et al. | 524/417 |
| 6,075,223 | 6/2000 | Harrison | 219/121.85 |

FOREIGN PATENT DOCUMENTS

| | | |
|---|---|---|
| 637517 | 2/1995 | (EP) . |
| 0 761 377 A1 | 3/1997 | (EP) . |
| 0 782 933 A1 | 7/1997 | (EP) . |
| 1-222994 | 9/1989 | (JP) . |
| 1-222995 | 9/1989 | (JP) . |
| 04198366 | 7/1992 | (JP) . |
| 03250031 | 9/1993 | (JP) . |
| 02165001 | 1/1994 | (JP) . |
| 07060464 | 3/1995 | (JP) . |
| 07237350 | 9/1995 | (JP) . |
| 07266695 | 10/1995 | (JP) . |
| 08031682 | 2/1996 | (JP) . |
| WO 95/13195 | 5/1995 | (WO) . |
| WO 96/32221 | 10/1996 | (WO) . |
| WO 99/16625 | 4/1999 | (WO) . |

OTHER PUBLICATIONS

Maurer et al., "High Speed Laser Marking", Semiconductor Fabtech.

Control Laser Corporation, "Laser Marking: Design and Process Fundamentals", On–Line Laser Technology Library, undated printout from web site: www.controllaser.com.

Anonymous, Research Disclosure 36079, abstract, Nov. 1994.

* cited by examiner

LASER MARKING METHOD AND APPARATUS

FIELD OF THE INVENTION

The present invention relates to laser marking, and more particularly relates to a method and apparatus for laser marking substrates such as glasses, ceramics, metals and plastics.

BACKGROUND INFORMATION

Laser marking methods have recently been developed for marking metals, plastics, ceramics and glasses. Laser marking of metals typically involves a vaporization process, wherein a laser is used to remove or ablate metal from the surface along the travel path of the laser. The resultant marking comprises engraved or indented portions which provide three-dimensional contrast to the surface of the metal. Alternatively, laser marking of metals may be achieved by annealing a selected portion of the metal surface to provide areas of contrasting color. In this case, instead of removing metal from the surface, the laser is used to heat the surface of the metal to an annealing temperature which typically results in darkening of the annealed regions.

Plastics are typically laser marked by either changing the color of the plastic or engraving the surface of the plastic along the travel path of the laser. The color of the plastic is typically changed by localized melting and re-solidification of the plastic. In contrast, engraving is achieved by vaporization and removal of the plastic. Plastic laser engraving methods can be used to remove a surface layer of the plastic to reveal an underlying layer of contrasting color. Such a process is disclosed in U.S. Pat. No. 5,061,341 to Kildal et al.

Laser marking of ceramics and glasses has also been investigated, as a replacement for conventional etching, engraving and glazing techniques. For example, laser marking of glass has been achieved by ablation techniques as disclosed in U.S. Pat. No. 4,327,283 to Heyman et al. and U.S. Pat. No. 4,515,867 to Bleacher et al. In the disclosed methods, two coating layers are applied to a glass substrate, and the top layer is removed by the laser to reveal the contrasting underlayer.

Another technique for laser marking ceramics and glasses is disclosed in U.S. Pat. No. 4,769,310 to Gugger et al. and U.S. Pat. No. 5,030,551 to Herren et al. In this technique, a glaze having a radiation-sensitive additive comprising an inorganic pigment or titanium dioxide is deposited and fired on the surface of a ceramic or glass substrate. A laser beam is then used to irradiate the fired surface layer to thereby change the color of the surface layer in the areas of irradiation.

Each of the patents cited above is incorporated herein by reference.

Despite the above-noted marking techniques, a need still exists for a method of marking substrates such as metals, ceramics, glasses and plastics which is versatile and can be performed quickly, and which produces permanent marks of high resolution and contrast with minimal or no damage to the substrate.

SUMMARY OF THE INVENTION

The present invention provides a method of laser marking substrates such as glass, ceramic, metal and plastic. A marking material is applied to the surface of the substrate, a portion of the marking material is irradiated to form a permanent marking on the surface of the substrate, and the non-irradiated portion of the marking material is removed from the substrate. The marking material may comprise glass frit or precursors thereof, inorganic pigments or precursors thereof, silicates, metal oxides, sulfides, nitrides and carbides, organometallic materials, metal powders and combinations thereof. The marking method produces permanent marks of high resolution and contrast with minimal or no damage to the substrate.

An object of the present invention is to provide a method of marking a surface of a substrate. The method includes the steps of applying a marking material to the surface of the substrate, irradiating a portion of the marking material with a beam to adhere the irradiated marking material to the substrate and to form a permanent marking thereon, and removing a non-irradiated portion of the marking material from the substrate.

Another object of the present invention is to provide a system for marking a surface of a substrate including means for applying a marking material to the surface of the substrate, means for irradiating a portion of the marking material with a beam to adhere the irradiated marking material to the substrate and to form a permanent marking thereon, and means for removing a non-irradiated portion of the marking material from the substrate.

These and other objects of the present invention will be more apparent from the following description.

DETAILED DESCRIPTION OF THE PREFERRED EMBODIMENTS

Figure 1:
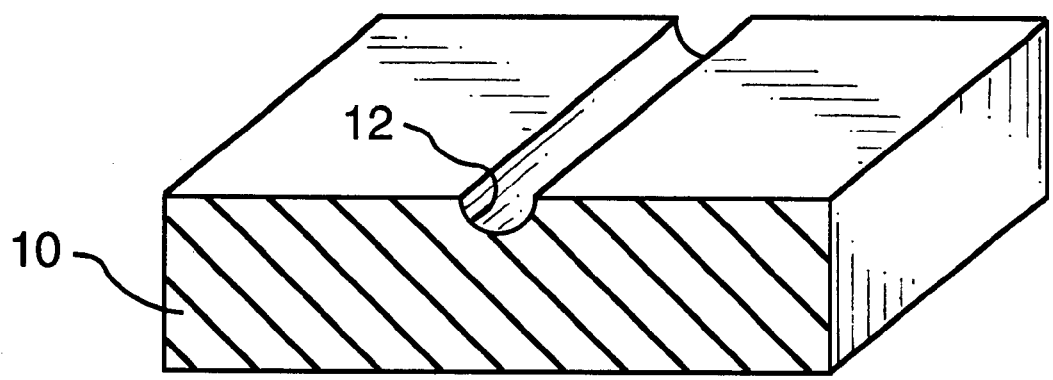
FIG. 1 is a schematic cross-section perspective view of a substrate that has been marked by a conventional laser ablation process.

FIG. 1 schematically illustrates a substrate 10 which has been ablated by a laser to form an engraved groove 12. In such conventional ablation processes, the laser is used to vaporize and remove a portion of the substrate 10. The resultant groove 12 provides a three-dimensional mark which typically has very low contrast.

Figure 2:
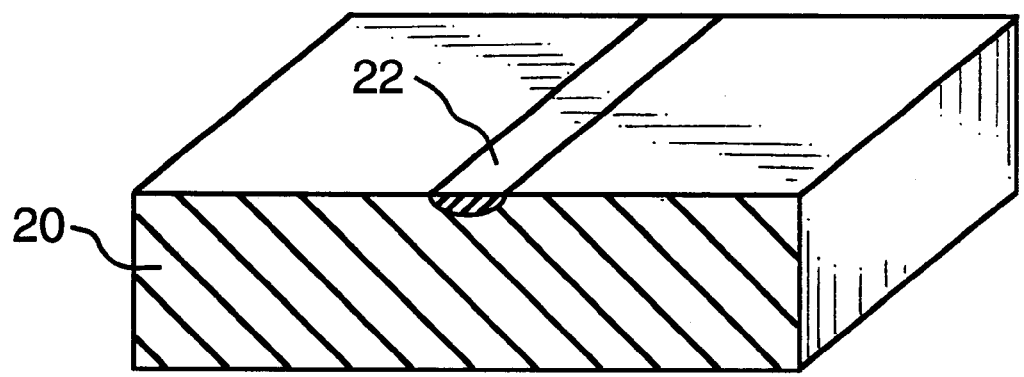
FIG. 2 is a schematic cross-section perspective view of a substrate that has been marked by a conventional laser annealing or color changing process.

FIG. 2 schematically illustrates another substrate 20 which has been irradiated by a laser to form a mark 22 of contrasting color. In this conventional process, laser marking is achieved by changing the visual characteristics of the irradiated substrate material. For example, a metal substrate such as aluminum, copper or steel may be anodized or heat treated by the laser to change the color or reflectivity of the metal in the treated region. Alternatively, a plastic substrate such as ABS, polycarbonate or PVC may be locally melted and resolidified in order to change its color in the treated area.

Figure 3A:
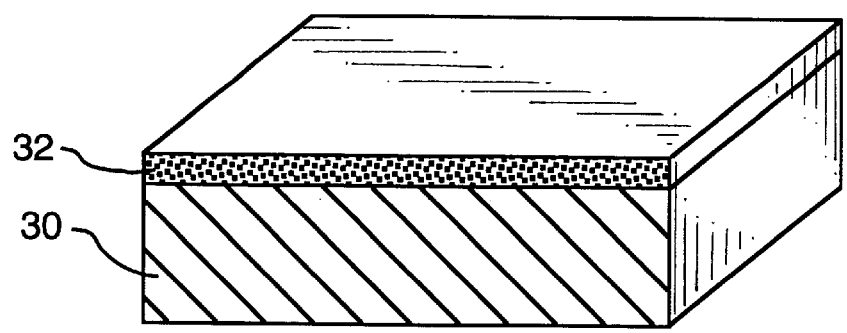
FIGS. 3a–3c are schematic cross-section views of a substrate, illustrating a laser marking method in accordance with an embodiment of the present invention.
Figure 3B:
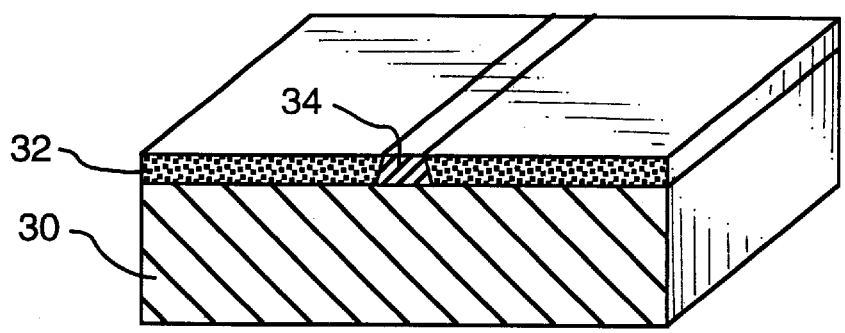
Figure 3C:
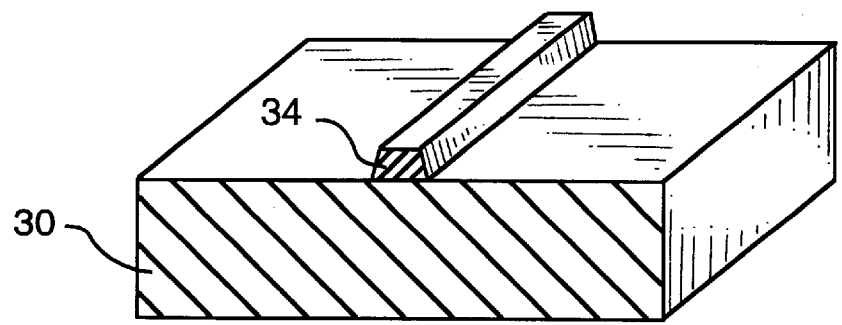

FIGS. 3a–3c illustrate a laser marking method in accordance with an embodiment of the present invention. In FIG. 3a, a substrate 30 has a layer of marking material 32 applied thereto. FIG. 3b illustrates the substrate 30 and marking material 32 after a portion of the marking material 32 has been irradiated by a laser (not shown) which travels across and projects a beam roughly perpendicular to the upper surface of the layer of marking material 32. The irradiated portion 34 is adhered to the surface of the substrate 30 and forms a permanent marking thereon. In FIG. 3c, the non-irradiated portion of the marking material 32 has been washed off, leaving the irradiated marking 34 on the substrate 30.

Figure 4A:
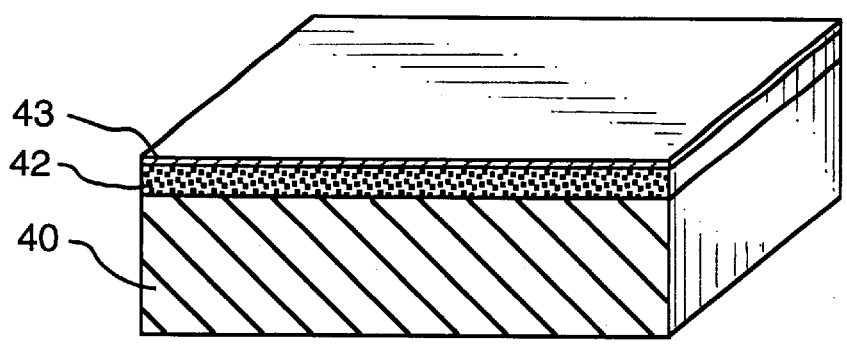
FIGS. 4a–4c are partially schematic sectional views of a substrate, illustrating a laser marking method in accordance with another embodiment of the present invention.
Figure 4B:
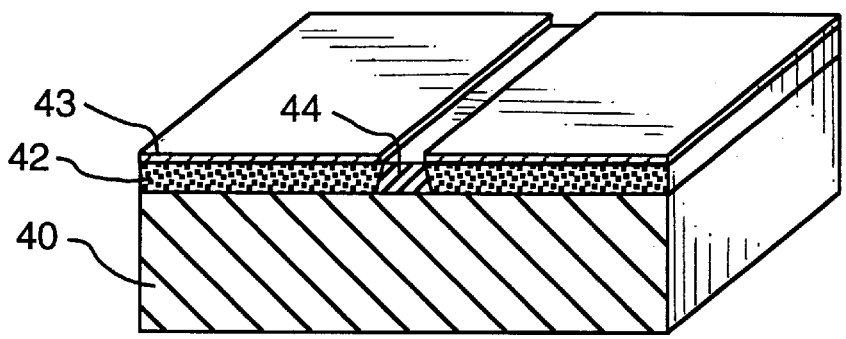
Figure 4C:
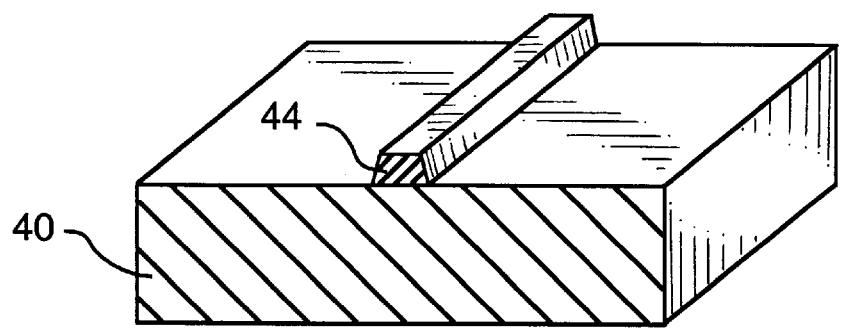

FIGS. 4a–4c illustrate a laser marking method in accordance with another embodiment of the present invention. In FIG. 4a, a layer of marking material 42 is adhered to an adhesive sheet of backing material 43. The backing material may comprise paper, plastic film or the like. The layer of marking material 42 and backing material 43 are applied to the substrate 40. FIG. 4b illustrates the substrate 40, marking material 42 and backing material 43 after a portion of the marking material 44 has been irradiated by a laser (not shown) which travels across and projects a beam perpendicular to the surface of the layer of marking material 42. The irradiated portion 44 is adhered to the surface of the substrate 40 and forms a permanent marking thereon. In FIG. 4c, the non-irradiated portion of the marking material 42 has been removed by peeling the backing material 43 and non-irradiated marking material 42 away from the substrate 40. The irradiated marking 44 remains permanently adhered to the substrate 40.

In accordance with the present invention, various substrate materials can be marked. For example, the present method may be used to mark glass, ceramic, brick, stone, metal, composite and plastic substrates.

Exemplary glass substrate compositions include lead as well as lead-free glasses such as soda lime silicates, borosilicates, aluminum silicates, fused silica and the like. Typical ceramic substrates include tiles, sanitary ware, stoneware bodies, porcelain bodies and bricks, as well as electronic quality ceramic substrates such as silica, alumina, aluminum nitride, etc. Stone substrates include marble, granite, slate, limestone and the like. Suitable metal substrates include steel, brass, copper, aluminum, tin, zinc and the like. Typical plastic substrates include PVC, polyamides, polyolefins, polyethylenes, polycarbonates and polytetrafluoroethylene. Combinations of the above substrate materials may also be used, such as porcelain enamelled steel substrates, glass coated ceramic bodies and glass enamelled bodies.

Substrates that may be marked in accordance with the present invention include automotive parts, automotive glass, aerospace parts, medical devices, electronic devices, tools, consumer products, packaging, glass bottles, metal cans, metal tags, bricks, tiles, plumbing, electrical and construction supplies, lighting and the like.

In accordance with the present invention, a marking material is applied to the surface of the substrate. The applied marking material may comprise glass frit such as lead or lead-free frit. Finely ground glass substrate materials are also suitable for marking glass substrates. As used herein, the term "glass frit" means pre-fused glass material which is typically produced by rapid solidification of molten material followed by grinding or milling to the desired powder size.

Preferred glass frits may comprise from 0 to about 75 weight percent lead oxide, from 0 to about 75 weight percent bismuth oxide, from 0 to about 75 weight percent silica, from 0 to about 50 weight percent zinc oxide, from 0 to about 40 weight percent boron oxide, from 0 to about 15 weight percent aluminum oxide, from 0 to about 15 weight percent zirconium oxide, from 0 to about 8 weight percent titanium oxide, from 0 to about 20 weight percent phosphorous oxide, from 0 to about 15 weight percent calcium oxide, from 0 to about 10 weight percent manganese oxide, from 0 to about 7 weight percent copper oxide, from 0 to about 5 weight percent cobalt oxide, from 0 to about 15 weight percent iron oxide, from 0 to about 20 weight percent sodium oxide, from 0 to about 20 weight percent potassium oxide, from 0 to about 15 weight percent lithium oxide and from 0 to about 7 weight percent fluoride, as well as other oxides conventionally used in glass frit compositions.

In addition to glass frit, precursors of such glass frit materials may be used as the marking material. Examples of glass frit precursors include metal oxides and glass formers, such as silica, zinc oxide, bismuth oxide, sodium borate, sodium carbonate, feldspars, fluorides and the like. In accordance with a preferred embodiment, substrate surface damage is minimized when glass frit precursors are used. While not wishing to be bound by any particular theory, it is believed that excess heat generated by the laser beam may be consumed by reacting the glass frit precursors with each other rather than overheating the substrate and creating surface damage such as micro-cracks.

Inorganic pigments such as spinels, zircons, rutiles, garnets, hematites, ultramarines and the like may also be used as the marking material. Suitable inorganic pigments include compounds comprising one or more metals combined with one or more anions of oxygen, sulfur and selenium.

In addition to inorganic pigments, precursors thereof are useful in forming high quality marks. For example, a light green colored mixture of titanium dioxide, antimony trioxide and chrome oxide, which is the precursor to Cr—Sb—Ti buff, when coated on glass and irradiated by the laser gives a buff colored mark. Glass substrate damage may be reduced when glass pigment precursors are used. Excess heat generated by laser beam may be consumed by reacting the pigment precursors with each other rather than creating surface damage in the glass substrate.

The marking material may also comprise alkali and other silicates such as water glass solution and colloidal silicates.

Metal oxides, sulfides, nitrides, carbides, and the like are also suitable marking materials. For example, cobalt oxide, copper oxide, iron oxide, praseodymium oxide, copper sulfide, iron sulfide, nickel sulfide, aluminum nitride, titanium nitride, chrome carbide and tungsten carbide may be used. Tin chloride, cobalt nitrate, cobalt carbonate, ferric sulfate and nickel sulfate may also be suitable marking materials.

Organometallic materials of various metals such as cobalt, copper, iron, etc., for example, sold under the designation CERADYE, or organometallic materials that can be prepared with various organic ligands such as acetyl acetonate, or with various organic acids, such as citric, acetic, naphthenic or octanoic acid may be used as marking materials, either in solution, suspension or dry state.

Furthermore, metal powders such as iron, copper, nickel, silver, chromium and the like may be used.

The above-noted marking materials may be used alone or in various combinations in accordance with the present invention. For example, a combination of metal oxides with glass frit, metal oxides with metal sulfides, inorganic pigments with glass frits, or precursors of inorganic pigments combined with glass frit precursors may be used. Energy absorption of the laser beam can be optimized if necessary by the addition of materials such as carbon black, titanium dioxide, neodymium oxide, praseodymium oxide and/or iron oxide to the marking material.

Table 1 lists exemplary marking materials suitable for use in accordance with the present invention.

TABLE 1

Marking Materials

Glass frits

Lead-containing frits*

E-1313
　E-1538
　E-1549
　E-1640
　E-1733
　E-1800
　E-1936
　E-1937
　E-2141
　Lead-free frits*

CA-1410
　E-8007
　E-8008
　E-8009
　E-8010
　E-8012
　E-8015
　E-8016
　E-8017
　E-8018
　E-8023
　E-8027
　GAL-10004
　GAL-10048
　RD-2051
　RD-2060
　RD-2070

Glass Frits Precursors alumina
　alumina hydrate
　antimony oxide
　barium carbonate
　barium sulfate
　bismuth oxide
　sodium borate
　boric acid
　boric oxide
　cadmium oxide
　calcium carbonate
　cerium oxide
　sodium aluminum fluoride
　silica
　calcium fluoride
　lead oxide
　lead bisilicate
　lithium carbonate
　potassium carbonate
　sodium carbonate
　sodium fluoride
　sodium nitrate
　sodium silica fluoride
　sodium sulfate
　titania
　vanadium oxide
　calcium silicate
　zinc oxide
　zirconia
　zirconium silicate
　manganese oxide
　copper carbonate
　copper oxide
　iron oxide
　magnesium oxide
　feldspar TABLE 1-continued Marking Materials strontium carbonate
　calcium phosphate
　nepheline syenite Inorganic pigments zirconium vanadium yellow baddeleyite
　chrome alumina pink corundum
　manganese alumina pink corundum
　iron brown hematite
　cobalt silicate blue olivine
　cobalt nickel grey periclase
　lead antimonate yellow pyrochlore
　nickel antimony titanium yellow rutile
　chrome antimony titanium buff rutile
　chrome niobium titanium buff rutile
　chrome tungsten titanium buff rutile
　manganese antimony titanium buff rutile
　chrome tin pink sphene
　cobalt aluminate blue spinel
　cobalt chromite green spinel
　cobalt titanate green spinel
　iron chromite brown spinel
　zinc ferrite brown spinel
　copper chromite black spinel
　manganese ferrite black spinel
　chrome iron nickel black spinel
　zirconium vanadium blue zircon
　zirconium praseodymium yellow zircon
　zirconium iron pink zircon Precursors of inorganic pigments titanium oxide, titanium hydroxide, titanium sulfate
　cobalt oxide, cobalt metal
　chromium oxide
　nickel oxide, nickel carbonate
　zirconium dioxide or zirconium hydroxide
　vanadium oxide or ammonium vanadate
　red iron oxide, yellow hydrated iron oxide, black iron oxide
　silica
　manganese dioxide, manganese (II, III) oxide,
　　managanese carbonate
　alumina, aluminum hydrate
　lead oxide
　antimony trioxide
　tungsten pentoxide
　niobium pentoxide
　zinc oxide
　copper oxide
　praseodymium oxide Silicates colloidal silicates
　potassium silicates
　sodium silicates
　lithium silicates
　hydrous sodium lithium magnesium silicate
　common clays Metal oxides cobalt oxide
　copper oxide
　iron oxide
　praseodymium oxide
　neodymium oxide Metal sulfides copper sulfide
　iron sulfide
　nickel sulfide
　cadmium sulfide
　cadmium sulfide selenide Metal nitrides aluminum nitride
　titanium nitride

TABLE 1-continued

Marking Materials

Metal carbides chrome carbide
    tungsten carbide

Organometallic materials citrate and ammonium citrate salts of manganese, cobalt, iron, and vanadium
    acetylacetonates and fluorinated acetylacetonates of transition metals
    metal carboxylates such as the transition metal and rare earth salts of napthenic, 2-ethyl hexanoic, and neodecanoic acids
    ethylene diamine tetraacetic acid and nitrilotriacetic acid salts of transition and rare earth metals
    metal complex dyes and pigments such as copper phthalocyanine blues and greens and dyes
    organosilicates, e.g., tetra-ethyl-ortho silane Metal powders iron
    copper
    nickel
    silver
    chromium
    zinc
    gold
    lead
    tin

*Commercially available from Cerdec Corporation

The layer of marking material is typically applied to the substrate with a thickness of at least about 0.1 micron, preferably from about 1 to about 300 microns, more preferably from about 5 to about 200 microns, and most preferably from about 10 to about 100 microns.

Various methods may be used to apply the marking material to the surface of the substrate. The substrate surface can be coated with powders of marking material or, preferably, it can be coated with a dispersion of the powders in a suitable media. Water based media are preferred because of their minimal environmental impact, but solvent based media can also be used to control drying rate, dispersion or moisture sensitivity of certain marking materials. In accordance with one embodiment, sol gel materials may be used to apply the marking material to the substrate. Where dispersions are used, the deposited layer can be dried prior to the irradiation step, however this is not necessary. The marking material in a water or solvent dispersion can be applied onto the substrate surface by various methods such as screen printing, brushing, spraying, roll coating, dipping, flow coating, electrostatic application and doctor blading. Marking materials can also be dispersed in high temperature waxes or polymers and applied to a substrate surface from a hot melt or by rubbing the surface of the substrate with such a material. Alternatively, the layer of marking material may be applied in the form of a tape, sticker or decal, and can be on the surface thereof or dispersed therein.

After the marking material is applied to the surface of the substrate, a selected portion of the marking material is irradiated with a beam to adhere the irradiated marking material to the substrate and to form a permanent marking thereon. For many types of markings, the selected portion of the marking material may comprise from about 1 to about 99 percent of the total surface area of the layer of marking material, typically from about 5 to about 95 percent. A laser is preferably used to selectively irradiate the marking material. However, other forms of focused energy may be used in accordance with the present invention. Irradiation may be achieved by moving a laser beam over a stationary substrate using conventional beam steering methods, by moving the substrate in relation to the laser beam and/or by masking the substrate. Laser irradiation is typically achieved by directing the beam directly against the layer of marking material, but may also be achieved by directing the beam through a sufficiently transparent substrate.

Suitable lasers for use in accordance with the present invention include neodymium:yttrium aluminum garnet (Nd:YAG) lasers, carbon dioxide ($CO_2$) lasers, diode lasers, excimer lasers and the like.

Typical YAG lasers emit light in the near-infrared spectrum at wavelengths of 1064 nm. Such lasers typically have continuous power outputs of from about 1 to about 50 watts, and can be operated in a pulsed mode at typical peak powers of from about 1 watt to about 45 kilowatts. For pulsed mode operation, frequencies of from about 1 to about 64,000 pulses/second may be used.

Typical $CO_2$ lasers emit light in the far-infrared region of the spectrum, with intensity spikes at wavelengths of 9.8 and 10.6 microns. Such $CO_2$ lasers typically operate at a continuous output power of from about 1 to about 40 watts.

In accordance with the present invention, the size of the laser spot that impinges the marking material is typically greater than 0.1 micron in diameter, preferably from about 40 to about 500 microns, and more preferably from about 50 to about 125 microns. The speed at which the laser beam travels across the surface of the marking material preferably ranges from 0 to about 100 inches/second (up to about 250 cm/second), more preferably from about 1 or 2 to about 20 inches/second (about 2.5 or 5 to 50 cm/second) for most thicknesses and compositions of marking material. The laser beam may be projected with a seam overlap of 0 to 100 percent, preferably from about 10 to about 90 percent for many applications. The laser parameters are controlled in order to provide sufficient localized heating of the marking material while avoiding unwanted damage to the substrate.

For many laser marking operations, a Lumonics LightWriter SPe YAG laser operating under the following parameters is suitable. Typically, marks on a glass substrate may be made using pulsing or continuous wave, lamp currents from about 28.5 to about 32.0 amps, energy levels from about 100 watts/$cm^2$ to about 5 megawatts/$cm^2$ during continuous wave operation, marking speeds from about 1 to about 20 inches/second (about 2.5 to 50 cm/second), laser dot sizes from about 0.002 to about 0.01 inches (about 50 and 250 microns), and seam overlaps from about 25 to about 50 percent. Laser marking is typically performed with the beam in focus, but may also be carried out with the beam out of focus. Lamp currents of from about 28.5 to about 30 amps and writing speeds of from about 2 to about 5 inches/second (about 5 to 12.7 cm/second) are particularly advantageous for many applications.

The laser beam, the movement of which can be controlled by a computer, may be used to create discrete symbols or designs or, alternatively, may be serially indexed across the surface of the marking material to create multiple symbols or designs at the same time. For example, a word may be created by separately making each letter of the word with the laser, or by rastering the laser across the entire word to form all of the letters at the same time.

During the irradiation step, the surface of the substrate may be exposed to any desired type of atmosphere. For example, the atmosphere may comprise air at atmospheric, sub-atmospheric or super-atmospheric pressures.

Furthermore, the atmosphere may comprise an inert gas such as nitrogen, argon or carbon dioxide, an oxidizing atmosphere such as air or oxygen, a reducing atmosphere such as hydrogen or carbon monoxide, or a vacuum.

Oxidizing or reducing gases can be used in a combination with inert gases. It is also possible to control the atmosphere on the surface of the substrate through the type of media the marking material is dispersed in. The atmosphere to which the surface of the substrate is exposed may affect the color and the quality of the mark. A single laser beam may be used for marking in accordance with the present invention. Alternatively, two or more laser beams may be used. For example, a first laser beam may be used to preheat the marking material and substrate, followed by a second laser which is used to adhere the marking material to the preheated substrate. This is particularly advantageous for marking glass because preheating may help to reduce internal stress and micro-cracking that can result from the laser marking operation.

In accordance with the present invention, a selected portion of the marking material is permanently adhered to the substrate upon irradiation. As used herein, the term "adhere" is used to designate any permanent means of attachment of the irradiated marking material to the substrate. For example, the irradiated marking material may be adhered to the surface of the substrate by sintering the marking material to the substrate, fusing the marking material to the surface of the substrate, diffusing at least a portion of the marking material into the substrate, reacting the marking material with the substrate and the like. As used herein, the term "permanent marking" means a non-temporary marking which, for example, possesses relatively high wear resistance, corrosion resistance and/or fading resistance.

The permanent markings produced in accordance with the present invention preferably have a thickness of from 0 to about 100 microns as measured from the surface of the substrate, preferably from about 0.05 to about 30 microns. Under the preferred marking conditions, substantially no indention or removal of the substrate is observed. In the case of glass substrates, it is preferable to avoid removal of the glass because indentations tend to weaken the glass substrate.

Upon irradiation, many different types of permanent marking compositions may be achieved in accordance with the present invention. Examples of permanent marking compositions include colored or colorless sintered glass frit, inorganic chromophores fused into the surface of the glass or metal substrate, a combination of the two, and metal oxide fused into the glass or metal surface or reacted with the substrate material. Because of the interaction with the marking material, the composition of the marking or indentation may depend on the composition of the substrate.

After the selected portion of the marking material has been irradiated, the non-irradiated portion of the marking material is removed from the substrate. In the embodiment shown in FIGS. 3a–3c, the non-irradiated portion of the marking material may be removed by methods such as washing, brushing off, vacuuming, subliming or blowing off the surface. In the embodiment shown in FIGS. 4a–4c, the non-irradiated portion of the marking material remains adhered to the adhesive sheet 43, and may be removed from the substrate 40 by peeling the adhesive sheet and non-irradiated layer of material away from the substrate.

Various types of marks may be produced in accordance with the present invention. For example, the marks may comprise alphanumeric symbols, graphics, logos, designs, decorations, serializations, bar codes, two dimensional matrices and the like. In addition, the markings may comprise three-dimensional lines forming patterns suitable for use in plasma display TV screens, fresnel lenses, polarizing filters, conductive circuits and the like.

In accordance with the present invention, permanent markings are formed with high contrast and high resolution. Resolution of the mark is determined by the size of the laser beam and the particle size of the marking material. Contrast/color of the mark is typically determined by the laser beam energy, marking material and atmosphere in which the marking is carried out.

In addition, the present markings have favorable wear, corrosion and fade resistance properties that are determined by the marking material and marking parameters. For example, marks created with glass frits have wear, corrosion and fade resistance properties similar to the resistance of the glass from which the frit was made.

Furthermore, by using conventional laser controlled hardware and software, the markings of the present invention may be quickly varied from operation to operation for applications such as serialization, bars codes, manufacturing quality control and automated manufacturing.

EXAMPLE 1

A paste consisting of 50 g fine powder $MnO_2$, 5 g of hydrous sodium lithium magnesium silicate, and 120 g of water was mixed in a ball mill and stored in a small jar. The paste was applied at a thickness of 6 mils (about 150 microns) wet on a 4×5 inch (about 10×13 cm) pane of window glass. The pane was placed on a hot plate until the paste dried. Laser marks were made with a Lumonics LightWriter SPe YAG laser under different laser settings. The laser was operated in continuous wave fashion. The beam current was 30 or 32 amps. Writing speeds of 1, 2, 5, 10 and 20 inches/second (about 2.5, 5, 125., 25 and 50 cm/second) were employed. Dot sizes of 0.002, 0.003, 0.004, 0.005, 0.01 and 0.02 inches (about 50, 75, 100, 125, 250 and 500 microns) were investigated. Single stroke fonts were used for these tests. The non-irradiated portion of the material was removed. The marks on the surface of the substrates were medium brown in color. The preferred mark was obtained at a beam current of 30 amps, a marking speed of 5 inches/second (about 12.5 cm/second) and a dot size of 0.005 inches (about 0.0125 cm).

EXAMPLE 2

A paste consisting of 50 g fine powder inorganic pigment sold by Cerdec under the designation 10399 Black, 5 g of hydrous sodium lithium magnesium silicate, and 120 g of water was mixed in a ball mill and stored in a small jar. The paste was applied at a thickness of 1.5 mils (about 38 microns) wet on a 4×5 inch (about 10×13 cm) pane of window glass. The pane was placed on a hot plate until the paste dried. Laser marks were made with a Lumonics LightWriter SPe YAG laser under different laser settings. The laser was operated in continuous wave fashion. The beam current was 32 amps. Writing speeds of 1, 2, 5, 10 and 20 inches/second (about 2.5, 5, 12.5, 25 and 50 cm/second) were employed. Dot sizes of 0.005, 0.01, and 0.02 inches (about 125, 250 and 500 microns) were investigated. Single stroke fonts were used for these tests. The non-irradiated portion of the material was removed. These marks on the surface of the substrates are bluish grey in color. The preferred mark in this run is achieved with the parameters:

32 amps beam current; continuous wave mode; 20 inches/second (about 50 cm/second) writing speed and 0.02 inch (about 250 microns) dot size.

EXAMPLE 3

A paste consisting of 50 g fine powder CuO, 5 g of hydrous sodium lithium magnesium silicate, and 120 g of water was mixed in a ball mill and stored in a small jar. The paste was applied at a thickness of 1.5 mils (about 38 microns) wet on a 4×5 inch (about 10×13 cm) pane of window glass. The pane was placed on a hot plate until the paste dried. Laser marks were made with a Lumonics LightWriter SPe YAG laser under different laser settings. The laser was operated in continuous wave fashion. The beam current was 30 or 32 amps. Writing speeds of 1, 2, 5, 10 and 20 inches/second (about 2.5, 5, 12.5, 25 and 50 cm/second) were employed. Dot sizes of 0.002, 0.003, 0.004, 0.005, 0.01 and 0.02 inches (about 50, 75, 100, 125, 250 and 500 microns) were investigated. Single stroke fonts were used for these tests. The non-irradiated portion of the material was removed. The resultant marks on the surface of the substrates are brown in color.

EXAMPLE 4

A paste consisting of fine powder 50 g cobalt oxide, 5 g of hydrous sodium lithium magnesium silicate, and 100 g of water was mixed in a ball mill and stored in small jars. The paste was applied at a thickness of 6 mils (about 150 microns) wet on a 4×5 inch (about 10×13 cm) pane of window glass. The pane was placed on a hot plate until the paste dried. Laser marks were made with a Lumonics LightWriter SPe YAG laser under different laser settings. The laser was operated in continuous wave fashion. The beam current was 30 or 32 amps. Writing speeds of 1, 2, 5, 10 and 20 inches/second (about 2.5, 5, 12.5, 25 and 50 cm/second) were employed. Dot sizes of 0.002, 0.003, 0.004, 0.005, 0.01 and 0.02 inches (about 50, 75, 100, 125, 250 and 500 microns) were investigated. Single stroke fonts were used for these tests. The non-irradiated portion of the material was removed. The marks on the surface of the substrates are blue in color. The darkest blue marks occur at writing speeds of 1 and 2 inch/second (about 2.5 and 5 cm/second).

EXAMPLE 5

A paste consisting of 79.4 weight percent of amber stain sold by Cerdec under the designation 29-346, 19.2 percent of water, and 1.4 percent hydroxypropyl cellulose was mixed and stored in a small jar. The paste was applied to a depth of one layer of Scotch tape on a 1.5×3 inch (about 3.8×7.5 cm) stainless steel tag. The tag was placed in a 90° C. oven until the paste dried. Laser marks were made with a Lumonics LightWriter SPe YAG laser under different laser settings. The laser was operated in a pulsed mode. The beam current was 30 or 32 amps. Writing speeds of 1, 2, 5, 10 and 20 inches/second (about 2.5, 5, 12.5, 25 and 50 cm/second) were employed. The dot size was 0.002 inches (about 50 microns). Pulsing speeds of 100, 500, 1,000, 5,000, 10,000 and 20,000 pulses/second were investigated. The non-irradiated portion of the material was removed. The marks on the surface of the substrates are dark brown in color. The mark with the highest contrast and resolution is provided with a lamp current of 30 amps, pulse rate of 10,000 pulses/second, a writing speed of 2 inches/second (about 5 cm/second), a dot size of 0.002 inches (about 50 microns) and seam overlap of 25 percent.

EXAMPLE 6

A paste containing 25 grams of fine particle cupric oxide, 25 grams of the raw batch for the commercially available zinc based frit sold under the designation Cerdec E-8012, 2 grams of hydrous sodium lithium magnesium silicate, and 40 grams of water was mixed on a vibratory mill. The paste was applied as a 3 mil (about 76 microns) film to a 4×5 inch (about 10.1×12.7 cm) pane of window glass. The pane was dried on a hot plate to remove the water. Laser marks were made with a Lumonics LightWriter SPe YAG laser under various laser settings. The laser was operated in continuous wave fashion. The beam current was 28.5, 30 or 32 amps. Writing speeds of 1, 2, 5, 10 and 20 inches/second (about 2.5, 5, 12.5, 25 and 50 cm/second) were employed. Dot sizes of 0.002, 0.003, 0.004, 0.005, 0.01 and 0.02 inches (about 50, 75, 100, 125, 250 and 500 microns) were investigated. Single stroke fonts were used for these tests. The non-irradiated portion of the material was removed. The marks on the surface of the substrates ranged from blackish to copper-color depending on laser energy settings. Fusing of the frit precursors is believed to have absorbed some of the excess heat and reduced the cracking of the glass substrate. The non-irradiated portion of the marking material was removed from the substrate after subjection to the laser beam.

EXAMPLE 7

A paste containing 25 grams Cerdec 2991 CuCr black, 25 grams Cerdec E-8015 frit, 2 grams hydrous sodium lithium magnesium silicate, and 40 grams water were mixed on a vibratory mill. The paste was applied as a 6 mil (about 152 micron) wet film to a 4×5 inch (about 10.1×12.7 cm) sheet of window glass. The pane of glass was dried on a hot plate. Laser marks were made with a Lumonics LightWriter SPe YAG laser under various laser settings. The laser was operated in continuous wave fashion. The beam current was 28.5, 30 or 32 amps. Writing speeds of 1, 2, 5, 10 and 20 inches/second (about 2.5, 5, 12.5, 25 and 50 cm/second) were employed. Dot sizes of 0.002, 0.003, 0.004, 0.005, 0.01 and 0.02 inches (about 50, 75, 100, 125 and 500 microns) were investigated. Single stroke fonts were used for these tests. The non-irradiated portion of the material was removed. The marks on the surface of the substrates were black with good contrast. The transition metals in the E-8015 frit are believed to have aided in the absorption and distribution of the laser energy and gave a mark with little damage to the substrate.

EXAMPLE 8

A tape cast from a paste consisting of 12 percent of an acrylic resin, 28 percent aromatic hydrocarbon solvent, 30 percent copper oxide and 3 percent Cerdec E-8015 was three roll milled, applied to transfer paper at a wet film thickness of 500 microns and force dried in a convection oven at 80° C. After drying, a repositionable adhesive was applied to the tape and force dried. The tape was applied to a 4×5 inch (about 10×13 cm) pane of window glass. The backing paper was then peeled away before marking with the laser. Laser marks were made with a Lumonics LightWriter SPe YAG laser under different laser settings. The laser was operated in continuous wave fashion. The beam current was 28.5, 30 or 32 amps. Writing speeds of 1, 2, 5, 10 and 20 inches/second (about 2.5, 5, 12.5, 25 and 50 cm/second) were employed. Dot sizes of 0.002, 0.003, 0.004, 0.005, 0.01 and 0.02 inches (about 50, 75, 100, 125 and 500 microns) were investigated. Single stroke fonts were used for these tests. The non-irradiated portion of the material was removed. The marks on the surface of the substrates are dark brown to black in color. The best marks occur at a beam current of 31 amps and a writing speed of 1 to 2 inches/second (about 2.5 to 5 cm/second).

EXAMPLE 9

A 1:1 mixture of $TiO_2$ and $Sb_2O_3$ was fused to form a single phase powder. This powder was dispersed in an organic medium and coated on polycarbonate. The film was dried before laser treatment. A Lumonics LaserWriter SPe was operated in continuous wave fashion. A bar code and a 6 digit single stroke font ID number were written in the white coating. With a beam current of 29.5A, a spot size of 0.005 inches (about 125 microns), a writing speed of 2 inch/second (about 5 cm/second) and a seam overlap of 50 percent, a high contrast bar code was written. By changing the speed to 1 inch/second (about 2.5 cm/second) the single stroke font was written on the surface of the polycarbonate with high contrast. These parameters produce continuous high contrast marks while simultaneously avoiding buring of the polycarbonate substrate.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of marking a surface of a substrate comprising:
    applying a marking material comprising a plurality of glass frit precursors to the surface of the substrate;
    irradiating a portion of the marking material with a beam to react the glass frit precursors with each other and to adhere the irradiated marking material on the surface of the substrate to form a permanent marking thereon; and
    removing a non-irradiated portion of the marking material from the substrate.

2. The method of claim 1, wherein the marking material further comprises glass frit.

3. The method of claim 2, wherein the glass frit comprises at least one material selected from the group consisting of lead oxide, bismuth oxide, silicon oxide, zinc oxide, boron oxide, aluminum oxide, zirconium oxide, titanium oxide, phosphorous oxide, calcium oxide, manganese oxide, copper oxide, cobalt oxide, iron oxide, sodium oxide, potassium oxide, lithium oxide and metal fluoride.

4. The method of claim 1, wherein the glass frit precursor comprises at least one material selected from the group consisting of alumina, alumina hydrate, antimony oxide, barium carbonate, barium sulfate, bismuth oxide, sodium borate, boric acid, boric oxide, cadmium oxide, calcium carbonate, cerium oxide, sodium aluminum fluoride, silica, calcium fluoride, lead oxide, lead bisilicate, lithium carbonate, potassium carbonate, sodium carbonate, sodium fluoride, sodium nitrate, sodium silica fluoride, sodium sulfate, titania, vanadium oxide, calcium silicate, zinc oxide, zirconia, zirconium silicate, manganese oxide, copper carbonate, copper oxide, iron oxide, magnesium oxide, feldspar, strontium carbonate, calcium phosphate and nepheline syenite.

5. The method of claim 1, wherein the marking material further comprises an inorganic pigment.

6. The method of claim 5, wherein the inorganic pigment comprises at least one material selected from the group consisting of metal oxides, sulfides and selenides.

7. The method of claim 1, wherein the marking material further comprises an inorganic pigment precursor.

8. The method of claim 7, wherein the inorganic precursor comprises at least one material selected from the group consisting of titanium oxide, titanium hydroxide, titanium sulfate, cobalt oxide, cobalt metal, chromium oxide, nickel oxide, nickel carbonate, zirconium dioxide or zirconium hydroxide, vanadium oxide or ammonium vanadate, red iron oxide, yellow hydrated iron oxide, black iron oxide, silica, manganese dioxide, manganese (II, III) oxide, managanese carbonate, alumina, aluminum hydrate, lead oxide, antimony trioxide, tungsten pentoxide, niobium pentoxide, zinc oxide, copper oxide and praseodymium oxide.

9. The method of claim 1, wherein the marking material further comprises a silicate.

10. The method of claim 9, wherein the silicate comprises at least one material selected from the group consisting of colloidal silicate, sodium silicate, potassium silicate, lithium silicate and hydrous sodium lithium magnesium silicate.

11. The method of claim 1, wherein the marking material further comprises at least one material selected from the group consisting of metal oxides, sulfides, nitrides and carbides.

12. The method of claim 11, wherein the marking material comprises at least one material selected from the group consisting of cobalt oxide, copper oxide, iron oxide, praseodymium oxide, copper sulfide, iron sulfide, nickel sulfide, cadmium sulfide, cadmium sulfide selenide, aluminum nitride, titanium nitride, chrome carbide and tungsten carbide.

13. The method of claim 1, wherein the marking material further comprises an organometallic material.

14. The method of claim 13, wherein the organometallic material comprises at least one metal or metal compound selected from the group consisting of cobalt, copper, iron, silica, zircon, titania and phosphorous.

15. The method of claim 1, wherein the marking material further comprises a metal powder.

16. The method of claim 15, wherein the metal powder comprises at least one metal selected from the group consisting of iron, copper, nickel, silver, chromium, zinc, gold, lead and tin.

17. The method of claim 1, wherein the marking material is applied to the surface of the substrate with a thickness of from 0.1 to 300 microns.

18. The method of claim 1, wherein the marking material is applied to the surface of the substrate with a thickness of from 5 to 200 microns.

19. The method of claim 1, wherein the marking material is applied to the surface of the substrate with a thickness of from 10 to 100 microns.

20. The method of claim 1, wherein the portion of the marking material is irradiated with a laser.

21. The method of claim 20, wherein the laser beam impinges on the substrate at a marking speed of from 0 to 100 inches/second.

22. The method of claim 20, wherein the laser beam travels across the substrate at a marking speed of from 1 to 20 inches/second.

23. The method of claim 20, wherein the laser beam has a spot size of from 0.1 to 500 microns in diameter.

24. The method of claim 20, wherein the laser beam has a spot size of from 50 to 125 microns in diameter.

25. The method of claim 20, wherein the laser beam is projected with a seam overlap of from 0 to 90 percent.

26. The method of claim 20, wherein the laser operates at a continuous wave energy of from 100 watts/$cm^2$ to 5 megawatts/$cm^2$.

27. The method of claim 20, wherein the laser is a YAG laser operating at a beam energy of from 28.5 to 32 amps.

28. The method of claim 20, wherein the portion of the marking material is irradiated in a controlled atmosphere.

29. The method of claim 20, wherein the portion of the marking material is irradiated with at least two laser beams.

30. The method of claim 1, wherein the permanent marking has a thickness of from 0 to 100 microns measured from the surface of the substrate.

31. The method of claim 1, wherein the permanent marking has a thickness of from 0.05 to 30 microns measured from the surface of the substrate.

32. The method of claim 1, wherein the permanent marking comprises sintered glass frit.

33. The method of claim 1, wherein the non-irradiated portion of the marking material is removed from the substrate by washing, brushing off, vacuuming, subliming or blowing off the surface.

34. The method of claim 1, wherein the marking material is adhered to a backing material.

35. The method of claim 34, wherein the marking material and the backing material are irradiated by a laser.

36. The method of claim 35, wherein the non-irradiated portion of the marking material is removed from the substrate by peeling the backing material and non-irradiated portion of the marking material away from the substrate.

37. The method of claim 1, wherein the substrate comprises glass.

38. The method of claim 1, wherein the substrate comprises ceramic.

39. The method of claim 1, wherein the substrate comprises brick.

40. The method of claim 1, wherein the substrate comprises stone.

41. The method of claim 1, wherein the substrate comprises metal.

42. The method of claim 1, wherein the substrate comprises a composite.

43. The method of claim 1, wherein the substrate comprises plastic.

44. The method of claim 1, wherein the substrate comprises glass selected from the group consisting of soda lime silicates, borosilicates, aluminum silicates and fused silica.

45. The method of claim 1, wherein the substrate comprises a ceramic selected from the group consisting of tiles, sanitary ware, stoneware, porcelain, alumina, aluminum nitride and silica.

46. The method of claim 1, wherein the substrate comprises stone selected from the group consisting of marble, granite, slate and limestone.

47. The method of claim 1, wherein the substrate comprises a metal selected from the group consisting of steel, brass, copper, aluminum, tin and zinc.

48. The method of claim 1, wherein the substrate comprises plastic selected from the group consisting of PVC, polyamides, polyolefins, polycarbonates and polytetrafluoroethylene.

49. The method of claim 1, wherein the marking material is dispersed into tape or a sticker.

50. The method of claim 1, wherein the marking material further comprises at least one material selected from the group consisting of glass frit, inorganic pigments, precursors of inorganic pigments, silicates, metal oxides, metal sulfides, metal nitrides, metal carbides, organometallic materials and metal powders.

* * * * *